July 12, 1966 A. BIBER ETAL 3,260,461

PROCESS OF ASPIRATING AND SPRAYING USING A SWIRLING FLUID JET

Filed Dec. 11, 1963 8 Sheets-Sheet 1

INVENTORS.
ALBERT BIBER
ORVIS A. DAVIS, SR.
BRUCE R. WALSH
BY

ATTORNEY

INVENTORS.
ALBERT BIBER
ORVIS A. DAVIS, SR.
BY BRUCE R. WALSH
ATTORNEY

PROCESS OF ASPIRATING AND SPRAYING USING A SWIRLING FLUID JET

Filed Dec. 11, 1963 8 Sheets-Sheet 3

INVENTORS.
ALBERT BIBER
ORVIS A. DAVIS, SR.
BY BRUCE R. WALSH
ATTORNEY

INVENTORS.
ALBERT BIBER
ORVIS A. DAVIS, SR.
BY BRUCE R. WALSH
ATTORNEY

INVENTORS
ALBERT BIBER
ORVIS A. DAVIS, SR.
BY BRUCE R. WALSH
ATTORNEY

PROCESS OF ASPIRATING AND SPRAYING USING A SWIRLING FLUID JET

Filed Dec. 11, 1963 8 Sheets-Sheet 6

INVENTORS.
ALBERT BIBER
ORVIS A. DAVIS, SR.
BY BRUCE R. WALSH

ATTORNEY

PROCESS OF ASPIRATING AND SPRAYING USING A SWIRLING FLUID JET

Filed Dec. 11. 1963 8 Sheets-Sheet 7

INVENTORS
ALBERT BIBER
ORVIS A. DAVIS, SR. &
BRUCE R. WALSH
BY
[signature]
ATTORNEY July 12, 1966 A. BIBER ETAL 3,260,461

PROCESS OF ASPIRATING AND SPRAYING USING A SWIRLING FLUID JET

Filed Dec. 11, 1963 8 Sheets-Sheet 8

INVENTORS
ALBERT BIBER,
ORVIS A. DAVIS, SR. &
BY BRUCE R. WALSH

ATTORNEY

United States Patent Office 3,260,461

Patented July 12, 1966

3,260,461

PROCESS OF ASPIRATING AND SPRAYING USING A SWIRLING FLUID JET

Albert Biber, Verona, Orvis A. Davis, Sr., Gibsonia, and Bruce R. Walsh, Pittsburgh, Pa., assignors to Gulf Research & Development Company, Pittsburgh, Pa., a corporation of Delaware Filed Dec. 11, 1963, Ser. No. 329,810
7 Claims. (Cl. 239—8)

Figure 1:
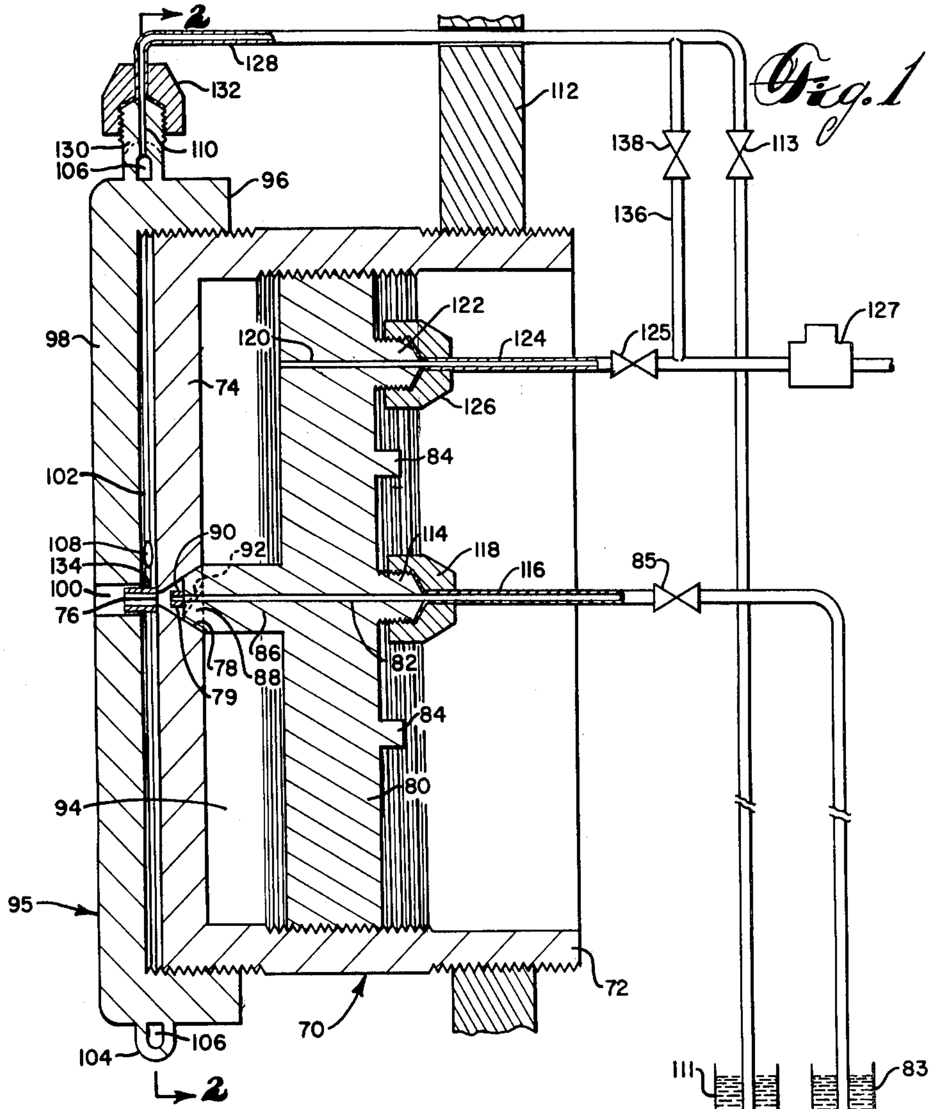

This application is a continuation-in-part of our copending application Serial Number 111,821, filed May 22, 1961. Serial Number 111,821, filed May 22, 1961, now abandoned, is a continuation-in-part of Serial Number 25,732, filed April 29, 1960, now abandoned.

This invention relates to aspirating processes and to aspirating nozzles wherein an aspirating fluid is employed to aspirate into a nozzle either a single or a plurality of other fluids. The aspirating fluid employed is generally a single gas such as air. The air or other aspirating gas is generally employed at a pressure only slightly superatmospheric, for example, at a pressure of about 2 to 10 pounds per square inch gauge. The 2 pound per square inch gauge pressure is employed when it is desired to aspirate a relatively small amount of fluid and the 10 pound per square inch gauge pressure is employed when it is desired to aspirate a relatively large amount of fluid into the nozzle.

It has been found that by employing air as an aspirating gas at a pressure of only 3 pounds per square inch gauge to aspirate into the nozzle liquid fuel oil which is at atmospheric pressure, an atomized fuel in air spray admixture is produced which when burned produces a flame which is much more compact and much less smoky as compared to the flame which is achieved when the oil is the substance that is pumped, even at pressures of 80 to 100 pounds per square inch gauge and even if atmospheric air is aspirated. Furthermore, the use of an aspirating gas to draw fuel oil into the nozzle solves serious nozzle operational problems since it permits the oil ducts in the nozzle to be of relatively large transverse cross section thereby permitting unobstructed oil passage. On the other hand, when the oil is charged under pressure, in order to achieve an equivalent oil flow rate it is necessary to employ oil ducts of such restricted transverse cross sectional area that frequent plugging occurs due either to difficultly removable solid impurities in the oil or to fuel carbonization caused by high nozzle temperatures.

In accordance with this invention a single aspirating fluid can produce a wide variety of advantageous mixtures. For example, aspirating air can draw into a nozzle a single liquid fuel oil to produce a spray comprising an admixture of the air and oil. Also, aspirating air can draw into a nozzle a first liquid fuel of one grade and a second liquid fuel of another grade to produce a spray comprising a fuel oil blend in admixture with air. Again, aspirating air can draw into a nozzle both a liquid fuel oil and an additive for the oil, such as a corrosion inhibitor, to produce a spray comprising air, fuel oil and additive. Additionally, a gaseous fuel as slightly superatmospheric pressure can be employed as an aspirating medium to draw into the nozzle liquid fuel oil and atmospheric air to produce a spray comprising gaseous fuel, liquid fuel and air. Nozzles of this invention can be constructed whereby three or more different components are drawn into the nozzle by means of the aspirating fluid to produce a corresponding spray comprising four or more components. Also, instead of aspirating a plurality of fluids the nozzles of this invention can be employed to aspirate multiple portions of a single fluid, such as a fuel oil, to increase the capacity of the nozzle in regard to that fluid.

A single chamber aspirating nozzle of this invention comprises an enclosed swirl chamber having a substantially circular cross section, an axial discharge passage is disposed at the forward end of said swirl chamber the narrowest portion of which constitutes a discharge orifice, swirling means is disposed at the rear of said swirl chamber, a tubular duct extends axially from the rear of said swirl chamber and terminates with an axial opening at an intermediate axial position in said swirl chamber between said swirling means and said discharge orifice, the diameter of said discharge orifice is larger than the internal diameter of said tubular duct, the outer surface of said tubular duct has a cylindrical configuration over substantially its entire length, said nozzle is free of means for imparting swirling to a fluid flowing within and from said tubular duct, said swirl chamber wall surface either converges substantially conically from said swirling means disposed to the rear of the axial terminus of said tubular duct to said discharge orifice or extends as a uniform cylinder from said swirling means disposed to the rear of the axial terminus of said tubular duct to said discharge orifice, said swirling means at the rear of said swirl chamber comprises swirling passageway means having swirling opening means which approach and enter said swirl chamber in both a forwardly and substantially tangential direction with respect to said conical or cylindrical swirl chamber wall surface adapted for the admission of a swirling pressurized gas in both a forwardly and substantially tangential direction with respect to said conical or cylindrical wall surface, said swirl chamber having rear enclosure means extending from the exterior of said tubular duct so that said swirl chamber is substantially completely enclosed at the rear thereof, and said opening means extends through not more than a minor proportion of the surface of the rear wall of said swirl chamber.

Figure 2:
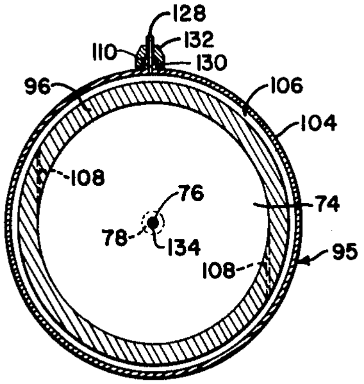
Figure 3:
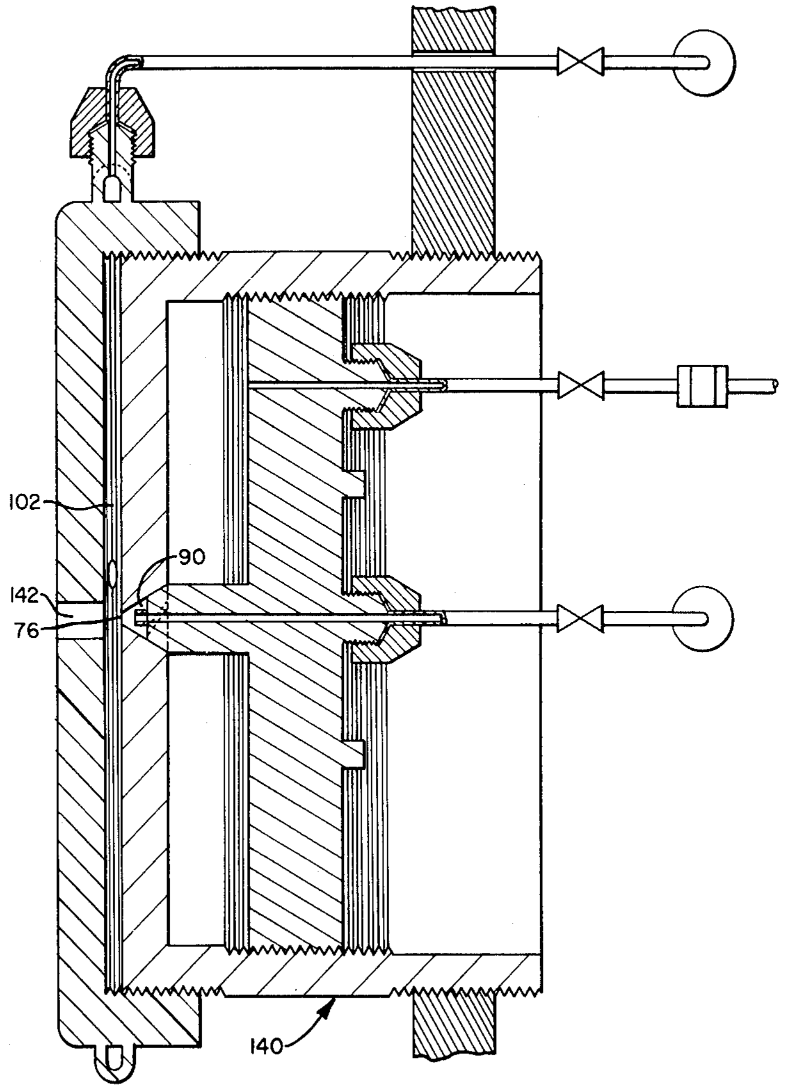
Figure 4:
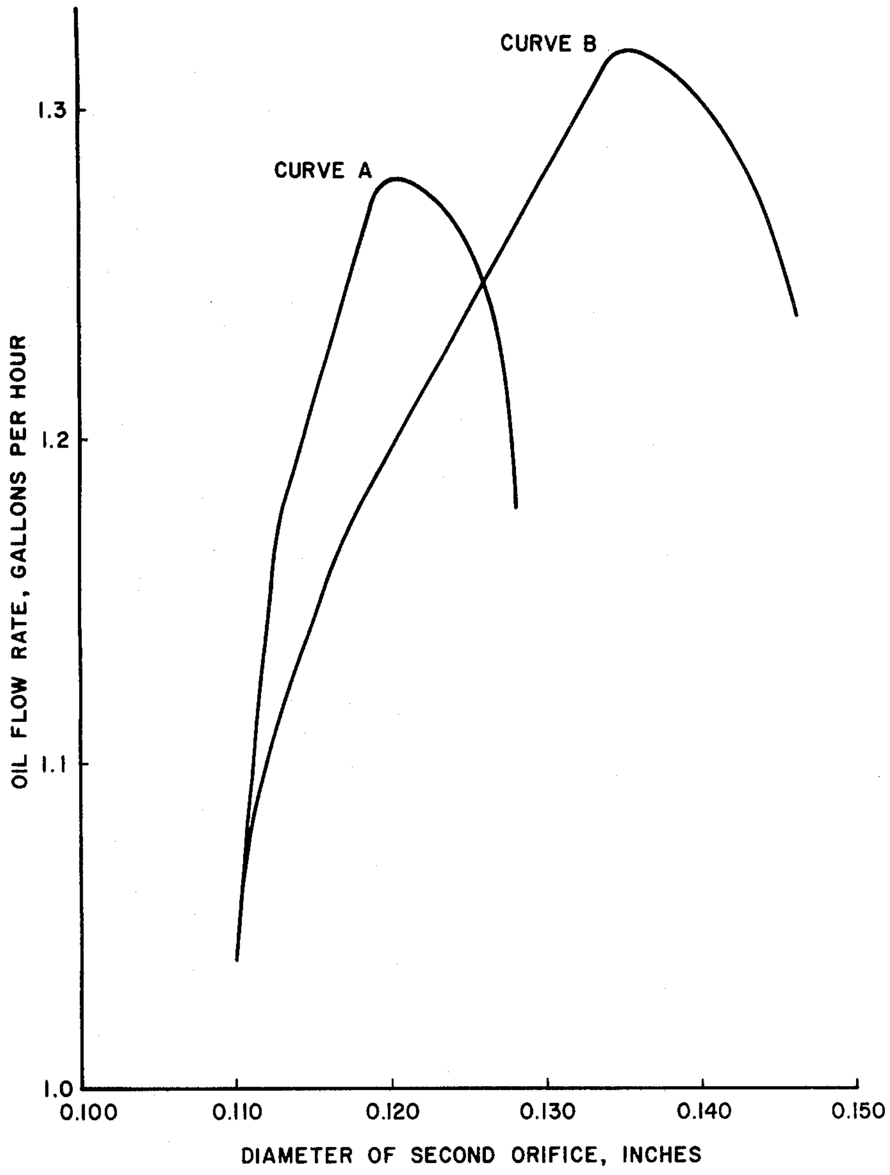

This invention will be more completely understood by reference to the attached drawings in which FIGURES 1, 2, 3, 5, 6, 12, 13, 14 and 16 are views of multiple chamber nozzles of this invention, FIGURE 4 presents data curves relating to multiple chamber nozzles, and FIGURES 7, 8, 9, 10, 11 and 15 are views of single chamber nozzles of this invention.

FIGURE 1 shows an elevational view of a longitudinal section through the axis of a nozzle designated generally as 70 and having a tubular body portion 72 which is internally and externally threaded as shown. The forward end of body portion 72 terminates with a substantially flat integral enclosure 74 which is on a plane transverse to the axis of tubular body 72. Enclosure 74 has an orifice opening 76 which is the apex of an axial conical bore 78.

A plug 80 having external threads and an axial bore 82 is equipped with two or more prongs 84 on its rear face so that it can be screwed into the interior of tubular body 72 as shown. Plug 80 has a central forwardly projecting stud 86 terminating with a frusto-conical swirl stem 88 which abuts firmly against the complementary interior surface of the base portion of conical bore 78 leaving unoccupied the apex of conical bore 78, said unoccupied apex constituting a swirl chamber 90. Swirl stem 88 has one or more peripheral slots 92 extending the length of the stem and providing passage between air chamber 94 and swirl chamber 90. Axial bore 82 constitutes a connecting passageway into swirl chamber 90 for the suction of a fluid which can be a gas but is advantageously a liquid such as, in this example, oil from an oil reservoir 83 disposed on a lower level. Axial bore 82 protrudes a portion of the distance into swirl chamber 90 by means of cylindrical tube 79.

A cap designated generally as 95 encloses the forward outer portion of tubular body 72 and the end enclosure 74 of tubular body 72. FIGURE 2 is a view of the cross section taken on plane 2—2 of FIGURE 1. Cap 95 has a side portion 96, a top portion 98 and an orifice opening 100 in the center of the top portion which opening is larger than orifice opening 76. Cap 95 is screwed in sealing engagement with tubular body 72 and the top portion 98 is spaced apart from enclosure 74 to form a chamber 102. A hollow rib 104 which is integral with side 96 of cap 95 has an interior chamber 106 from which one or more passageways 108 approach chamber 102. Passageways 108 can approach chamber 102 radially but preferably approach chamber 102 tangentially as shown in FIGURE 2. An inlet passage 110 to space 106 is provided through the interior of boss 130.

Figure 6:
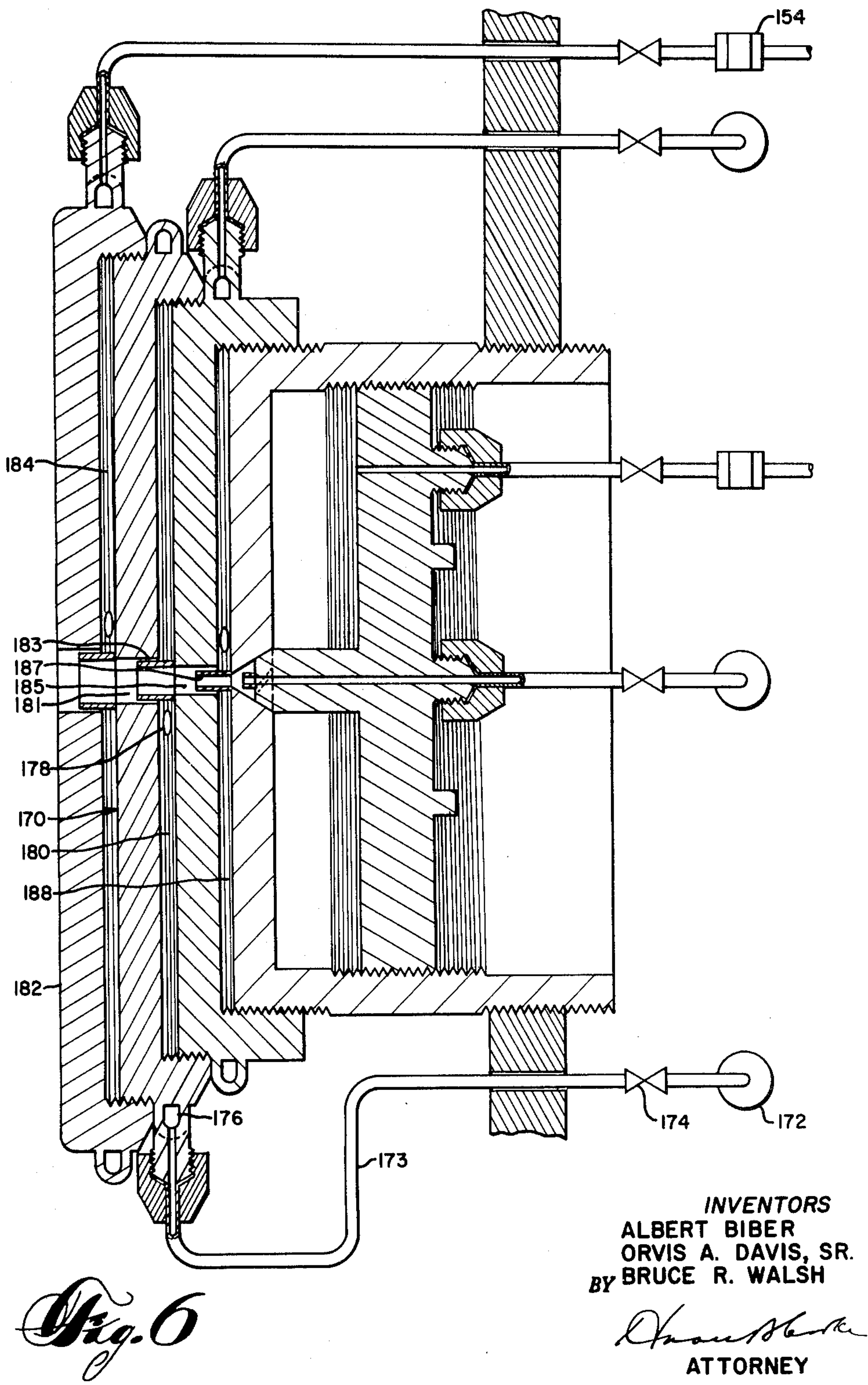

A cylindrical duct 134 extends from orifice 76 axially into cylindrical orifice 100. Duct 134 can extend a portion of the distance to orifice 100 but if such a duct is employed it preferably extends into orifice 100, as shown. The outer diameter of duct 134 is less than the diameter of orifice 100, providing a diameter differential therebetween. By extending the duct into orifice 100, the aspirational effect is exerted upon chamber 102 with a diminished divergence of spray from swirl chamber 90 during transit through orifice 100, thereby permitting the diameter of orifice 100 to be smaller than that which would be required in the absence of duct 134. Where a multiplicity of nozzle caps are employed, as illustrated in FIGURE 6, this consideration becomes increasingly important.

After the plug 80 is screwed tightly in the interior of tubular body 72 and the cap 95 is screwed onto the exterior of tubular body 72 as shown the resulting nozzle assembly is secured into position for use, for example, by screwing tubular body 72 into a furnace wall 112. After the nozzle is assembled and secured into place, oil reservoir 83 which is open to the atmosphere is connected to the nozzle at externally threaded boss 114 extending rearwardly from the center of plug 80 and coaxial with oil passageway 82. Suitable flared tubing 116 is attached in sealing connection to boss 114 by means of nut 118. Aspirating fluid flows to chamber 94 from pressurized chamber 127 through valve 125 and passageway 120 in plug 80 terminating with rearwardly extending externally threaded boss 122 to which flared tubing 124 is attached in sealing connection by means of internally threaded nut 126. The aspirating fluid can be a liquid but is preferably a gas at a slightly superatmospheric pressure such as, in this example, air at 3 pounds per square inch gauge. Whatever the pressure of the air it must be at a pressure higher than the fluids under aspiration. A second body of fluid under aspiration such as liquid fuel oil of the same or, as in this example, a different grade than that contained in reservoir 83 is supplied to chamber 106 through passageway 110 from reservoir 111, vented to atmosphere, by attaching flared tubing 128 equipped with valve 113 in sealing connection with boss 130 by means of nut 132. Tubes 128 and 124 are tied into each other by means of connecting tube 136 having a valve 138.

In operating the nozzle shown in FIGURES 1 and 2 to aspirate the fluids in both reservoir 83 and reservoir 111, slightly superatmospheric air is charged through air passageway 120 to air chamber 94 from which it is passed through slots 92 and approaches swirl chamber 90 in a substantially tangential manner. The air swirls in swirl chamber 90 creating an evacuated axial vortex which draws a first grade of fuel oil from reservoir 83 through tube 116, axial passageway 82 and duct 79 into swirl chamber 90 to form a first mixture of air and oil. Duct 79 allows the air to assume an adequate swirling and axial pattern of movement prior to exposure of oil to it. The cylindrical configuration of the outer surface of duct 79 prevents transverse motion of air across its open end, thereby preventing air back pressure against oil from the reservoir. In the absence of duct 79 no aspiration of oil from the reservoir would occur. The mixture passes through orifice opening 76 and duct 134 into second orifice 100 where, with valve 138 being closed, it aspirates into itself a second grade of oil from reservoir 111 which enters chamber 102 through tube 128, having open valve 113, bore 110, annulus 106 and tangential slots 108 to form a second mixture of air and a blend of two oils of different grades which mixture is then emitted through orifice 100. The quantity of oil aspirated from reservoir 111 depends upon the differential diameter between duct 134 and orifice 100. Also, the quantities and proportions of oil from reservoirs 111 and 83 being blended by the nozzle can be adjusted externally by regulation of valves 113 and 85, respectively. Operation of the nozzle can be terminated merely by closure of air valve 125 without ensuing drippage of oil from the nozzle by virtue of oil reservoirs 111 and 83 being disposed below nozzle level.

FIGURE 3 shows a plan view of a longitudinal section through the axis of a nozzle designated generally as 140 which is similar to the nozzle illustrated in FIGURES 1 and 2 except in two respects. The first difference is that duct 134 shown in FIGURE 1 is omitted so that orifice 76 discharges directly into the rear of chamber 102. The second is that the diameter of orifice 142 is larger than the corresponding dimensions of orifice 100 shown in FIGURE 1. Since the spray from swirl chamber 90 has the general configuration of a cone whose apex is at the point of emission from the chamber, the absence of duct 134 results in effectively transposing the spray rearwardly so that its transverse diameter at the orifice 142 is greater by an amount dependent upon the length of duct 134, as compared with the spray produced with the use of a duct 134. Accordingly, orifice 142 is larger than orifice 100.

In a highly important aspect the nozzle of FIGURE 3 is preferred over the nozzle of FIGURE 1. It was found in testing two substantially identical nozzles differing from each other only in that the first possessed a duct similar to the duct 134 of FIGURE 1 and the second was devoid of such a duct, as shown in FIGURE 3, that a greater fuel oil aspiration rate was possible with the second nozzle. Each nozzle aspirated ASTM Number 2 fuel oil under atmospheric pressure in both the first and second chambers in the manner outlined in the above description of operation of the nozzle of FIGURE 1. All tests were made with aspirating air at a pressure of 3 pounds per square inch gauge, an air flow rate of approximately 42 cubic feet per hour and a fuel oil lift of one inch. Data were taken by testing each nozzle following stepwise increases of the second chamber orifice diameter accomplished by machining progressively larger cylindrical second orifice bores. The results are shown in FIGURE 4 wherein curve A represents the data taken with a nozzle possesing a duct 134 as shown in FIGURE 1 and wherein curve B represents the data taken with a nozzle devoid of such a duct as shown in FIGURE 3. The only variable adjusted for each nozzle was the diameter of the second orifice. As shown in FIGURE 4, under similar conditions the nozzle of FIGURE 3 is capable of a greater aspiration rate of fuel oil than is the nozzle of FIGURE 1.

It is noted that a nozzle similar to that employed in obtaining the data shown in curves A and B of FIGURE 4 except that the second chamber cap was removed, thereby converting it into a single chamber nozzle, was capable of aspirating only 0.54 gallon per hour of ASTM Number 2 fuel oil with 3 pounds per square inch gauge air and a one-inch oil lift. In all tests made the orifice diameter of the first chamber was 0.087 inch. FIGURE 4 shows that in the case of curve A, the optimum flow occurs at an orifice diameter ratio of 1.38, while ratios between 1.2 and 1.5 generally and between 1.3 and 1.5 preferably are desirable. The optimum ratio for curve B is 1.56 while ratios between 1.2 and 2.0 generally and between 1.3 and 1.8 preferably give good results. There is less criticality in diameter ratios and better aspiration rates in respect to curve B as compared to curve A.

Figure 5:
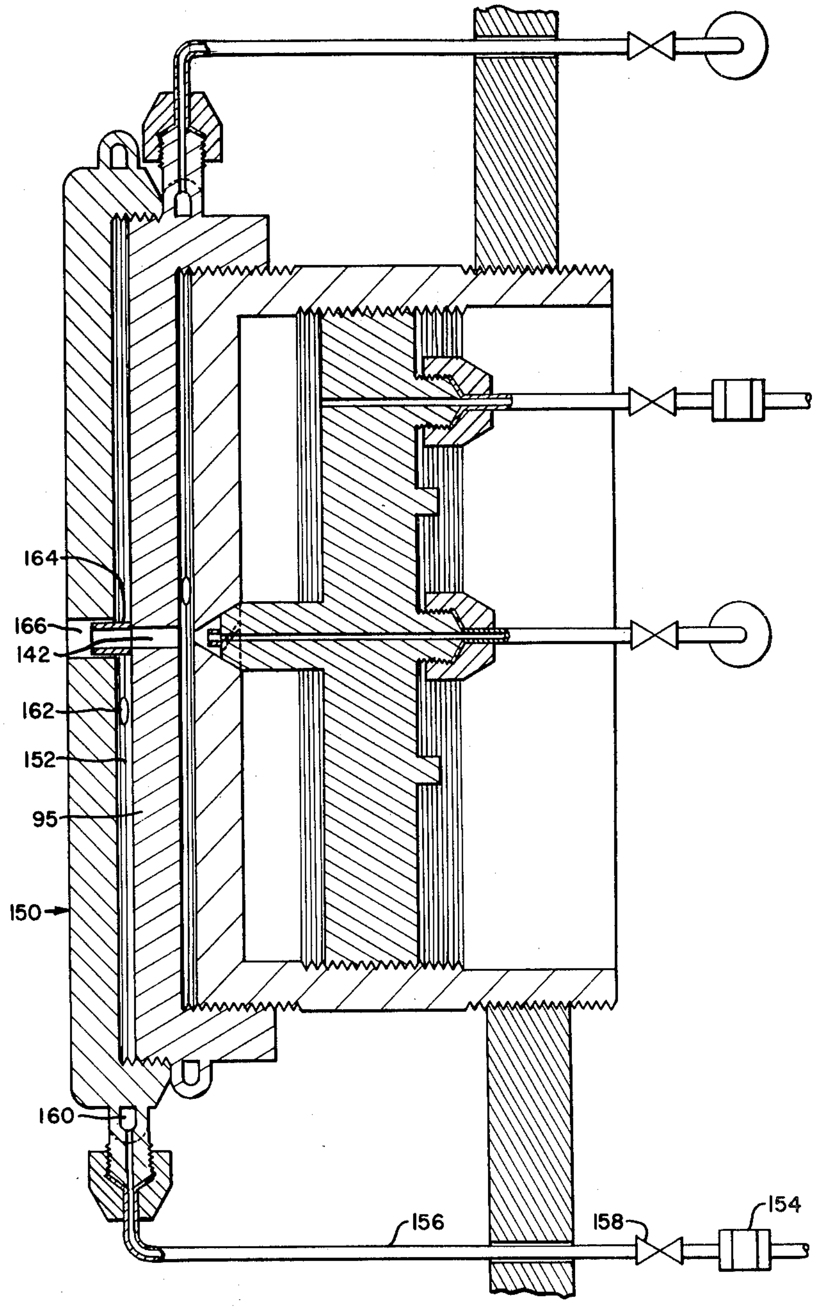

FIGURE 5 shows still another multiple fluid aspirating nozzle of this invention. It is seen that the nozzle of FIGURE 5 is generally similar to that of FIGURE 3 but that a forward chamber has been added. As shown above, the nozzle of FIGURE 3 is a highly effective aspirating device. However, it has been found that upon combustion of a fuel-air spray from the nozzle of FIGURE 3, the flame can be improved in two important respects by the modification of the nozzle as shown in FIGURE 5.

The nozzle of FIGURE 5 incorporates a forward swirl chamber onto the nozzle of FIGURE 3 by screwing onto cap 95 a similar but larger cap 150, as shown, to form swirl chamber 152 therebetween. Swirl chamber 152 is connected to a source of pressurized fluid 154, preferably a gas source such as air at 3 pounds per square inch gauge, which is suppled through tubing 156, regulated by valve 158. The pressurized air passes into annulus 160 and thence tangentially into swirl chamber 152 through tangential inlet port 162. In order to prevent back pressure against orifice 142 a cylindrical duct 164 extends outwardly from orifice 142 at least a portion of the distance along the length of cylindrical chamber 166. The cylindrical configuration of the outer surface of duct 164 prevents transverse movement of pressurized air across the opening of the duct. Any transverse movement of pressurized air across the duct opening would create a back pressure in the nozzle and render the nozzle inoperative. Superatmospheric air entering through tangential inlet port 162 swirls in swirl chamber 152 and outwardly through chamber 166 where it draws into itself the mixture passing through duct 164.

The respects in which incorporation of the forward swirl chamber illustrated in FIGURE 5 improves the nozzle of FIGURE 3 are: first, combustion of the spray is rendered more complete by virtue of a high air-fuel ratio as evidenced by both diminution of yellowish flame coloration and elimination of slight traces of visible smoke and the flame is rendered more highly compact. Improvement of both the combustion and physical characteristics of the flame in this manner, coupled with the demonstrated high aspirational efficiency of the basic nozzle of FIGURE 3, renders the nozzle of FIGURE 5 a highly advantageous nozzle of this invention.

A single fluid aspirating nozzle of this invention is similarly improved by provision of a forward swirl chamber of the type illustrated in FIGURE 5. In this regard, referring to FIGURE 1, closure of valve 113 and opening of valve 138 converts the nozzle of FIGURE 1 into a highly advantageous single fluid aspirating nozzle improved with a forward swirl chamber.

The nozzle shown in FIGURE 6 illustrates the use of an intermediate series of chambers, rather than only a single intermediate chamber as shown in FIGURE 5, for the purpose of increasing the number of fluids being aspirated into the nozzle. Whereas the nozzle of FIGURE 1 is capable of aspirating inwardly two fluids, one from reservoir 83 and another from reservoir 111, the nozzle of FIGURE 6 by the addition of intermediate cap 170 is capable of inward aspiration of a third fluid from reservoir 172, through tube 173 and valve 174, annulus 176, tangential opening 178 and chamber 180. The diameter of orifice 181 is larger than the diameter of generally cylindrical duct 183 and the diameter of orifice 185 is larger than the diameter of generally cylindrical duct 187 by an amount sufficient to accomplish substantial aspiration of nonpressurized fluid into chambers 180 and 188, respectively. More than one fluid could be aspirated into a single chamber to avoid utilization of a series of chambers but such would entail extreme difficulties in construction. Cap 182 forms a swirl chamber 184 to which air is supplied from pressurized air reservoir 154 in accordance with the description of the nozzle of FIGURE 5.

Figure 7:
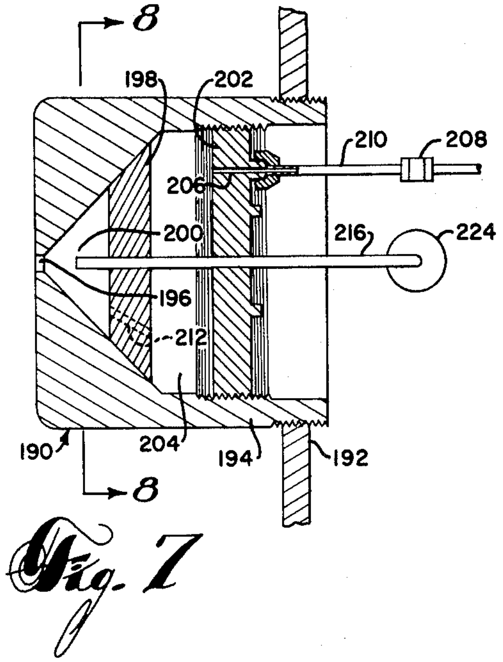
Figure 8:
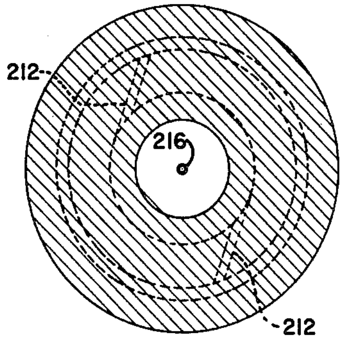

FIGURE 7 illustrates a single chamber nozzle of this invention designated generally as nozzle 190. FIGURE 8 is a view taken through the section 8—8 in FIGURE 7. FIGURE 7 shows a plan view of a longitudinal axial section of nozzle 190 maintained in position by a suitable support 192. Nozzle body 194 has a forward orifice 196 and is externally and internally threaded as shown. Frusto-conical swirl stem 198 abuts in sealing engagement against a complementary internal surface in the forward portion of nozzle body 194 to form a conical swirl chamber 200 between it and orifice 196. Alternately, swirl chamber 200 could be cylindrical rather than conical by appropriate modification of nozzle body 194. A plug 202 is screwed in sealing engagement with the internal surface of the rearward portion of nozzle body 194 to define an aspirating air chamber 204 between it and swirl stem 198. Plug 202 has a longitudinal bore 206 through which aspirating air is supplied through tube 210 from a pressurized air source 208. Air entering chamber 204 passes through one or more peripheral slots 212 on swirl stem 198 which enter swirl chamber 200 both in a forwardly direction with respect to the conical wall surface of swirl chamber 200, as is shown in FIGURE 7, and substantially tangentially with respect to the conical wall surface of swirl chamber 200, as is shown in FIGURE 8. Since slots 212 enter swirl chamber 200 both in a forwardly direction with respect to the conical wall surface of swirl chamber 200, as is shown in FIGURE 7, and substantially tangentially with respect to the conical wall surface of swirl chamber 200, as is shown in FIGURE 8, the air passing through slots 212 enters swirl chamber 200 in both a forwardly and a substantially tangential direction with respect to the conical wall surface of swirl chamber 200. Swirl stem 198 and plug 202 are each equipped with an axial longitudinal bore. Axial tube 216 extends through the axial bores in swirl stem 198 and plug 202 in sealing engagement therewith from the rear of the nozzle into swirl chamber 200 for a portion of the length thereof. Swirl stem 198 constitutes means for enclosing the rear of swirl chamber 200 and the forward face of swirl stem 198 extends between the exterior of tubular duct 216 and the conical swirl chamber wall surface to substantially completely enclose the rear of the swirl chamber. Aspirating gas inlet groove 212 extends through not more than a minor proportion of the rear wall surface of swirl chamber 200. Groove 212 is confined only to a region laterally remote from tubular duct 216 and close to the swirl chamber wall surface. The rear of tube 216 extends downward into the fluid contained in reservoir 224. Tube 216 extends a greater distance into swirl chamber 200 from the rear thereof than the distance of the opening of the aspirating gas inlet groove 212 from the rear of the swirl chamber. In this manner air entering through tangential slot 212 has an opportunity to assume both a swirling and axial pattern of movement and travel past the opening of tube 216 in a direction which is parallel to the nozzle axis, thereby permitting a suction to be exerted at this opening to which is exposed the fluid in fluid storage reservoir 224. While swirl chamber 200 is equipped with means for inducing swirling therein, the nozzle is free of means for imparting swirling to fluid flowing from axial duct 216. The narrowest portion of discharge orifice 196 is larger than the internal diameter of axial duct 216 and the wall surface of swirl chamber 200 converges substantially conically from aspirating gas inlet groove 212 to a position to the rear of the axial terminus of axial duct 216 to the narrowest portion of the discharge orifice.

Figure 9:
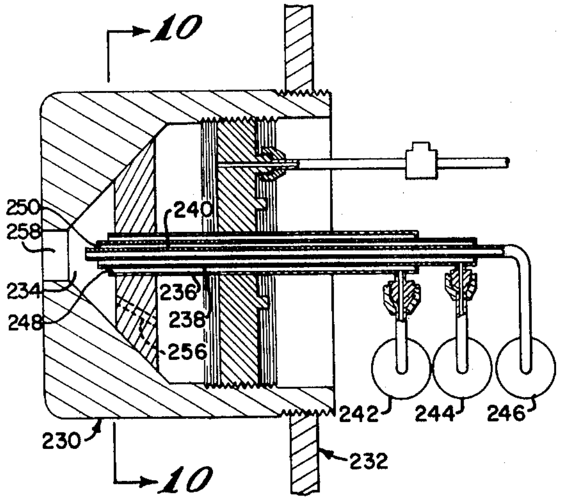
Figure 10:
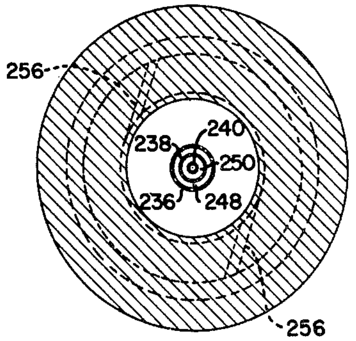

FIGURE 9 shows a single chamber aspirating nozzle of this invention which is adapted for the aspiration of a plurality of fluids and which is designated generally as nozzle 230. FIGURE 9 shows a longitudinal axial sectional plan view of nozzle 230 secured fixedly in place by a support 232 and FIGURE 10 is a view facing the section 10—10 of FIGURE 9. Nozzle 230 has a plurality of coaxial and concentric ducts forming annular spaces therebetween. FIGURE 9 shows outer, intermediate and inner concentric cylindrical ducts designated as ducts 236, 238 and 240, respectively. Ducts 236, 238 and 240 extend from fluid reservoirs 242, 244 and 246, respectively. The fluids in reservoirs 242 and 244 are exposed to the swirling gas vortex in swirl chamber 234 through annular spaces 248 and 250, respectively, while the fluid in reservoir 246 is exposed to the swirling gas vortex in swirl chamber 234 through the interior of tube 240. As shown, inner tube 240 extends the greatest axial distance into swirl chamber 234, intermediate tube 238 extends an intermediate distance and outermost tube 236 extends the smallest axial distance thereinto but this smallest distance is still a greater distance from the rear of swirl chamber 234 than is the distance of the tangential inlet ports of swirling gas slots 256 from the rear of the swirl chamber. In this manner the aspirating gas entering swirl chamber 234 through tangential inlet slots 256 has an opportunity to form a swirling gas vortex prior to exposure of fluid in annular space 248 thereto. The swirling gas in its axial movement through swirl chamber 234 aspirates fluid first from annular space 248 to form a first mixture which mixture then has an opportunity to travel a further axial distance through the swirl chamber and assume an adequate swirl pattern prior to aspirating into itself fluid through annular space 250 to form a second mixture. This second mixture then travels a further axial distance through swirl chamber 234 having an opportunity to itself assume an adequate swirl pattern prior to aspirating into itself the fluid from innermost tube 240 to form a third mixture. This third mixture is then discharged from the swirl chamber through orifice 258. The staggered arrangement of concentric tubes 236, 238 and 240 in the swirl chamber 234 is thereby seen to permit efficient inward aspiration of a plurality of fluids into a single chamber.

Figures 11, 12, 13:
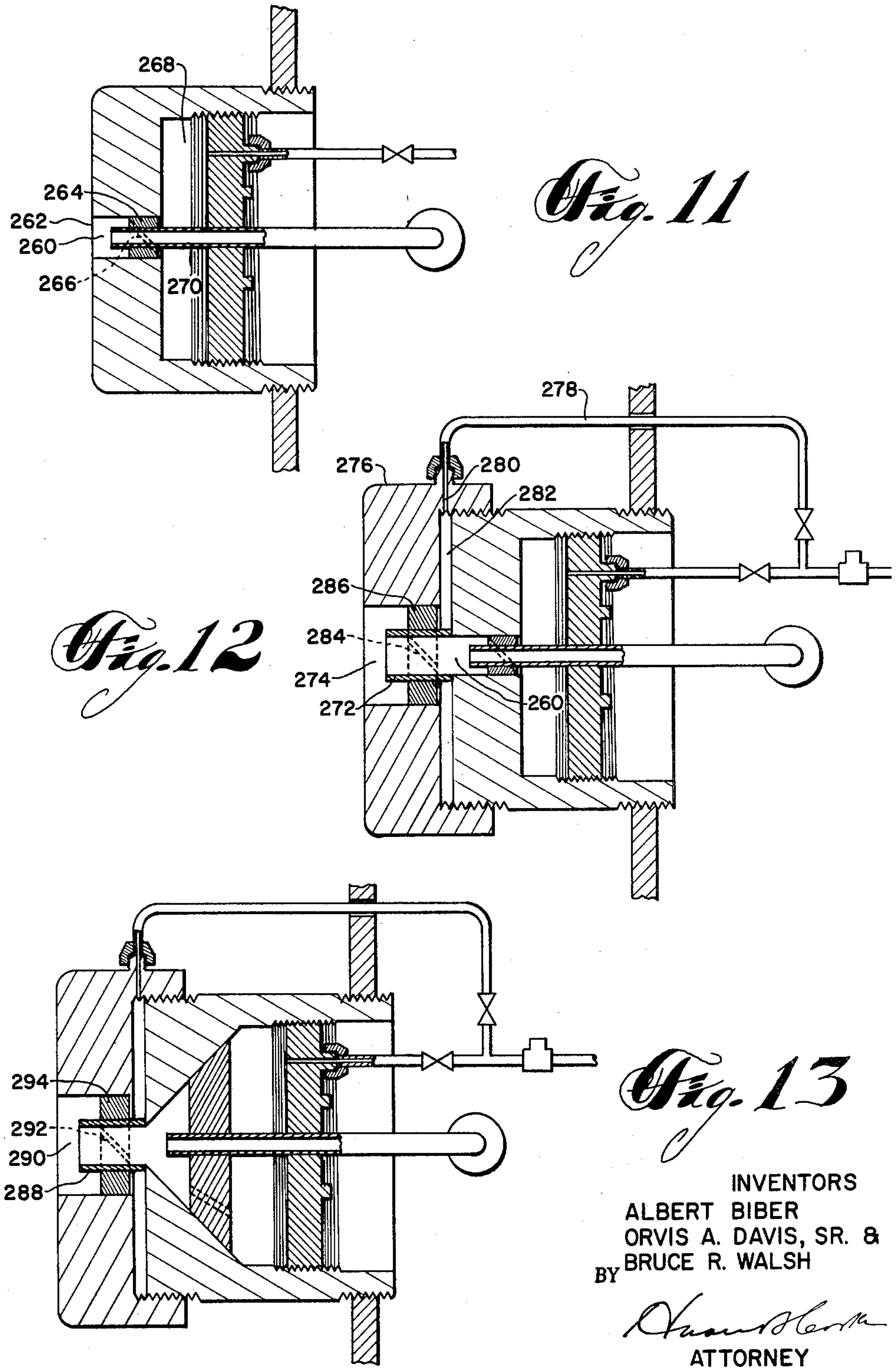

FIGURE 11 shows a nozzle with a single swirl chamber 260 having a uniform cylindrical configuration from the rearward end thereof to discharge opening 262 at its forward end. The rear wall of swirl chamber 260 is defined by swirl stem 264 which is cylindrical in shape and whose outer diameter is substantially equal to the diameter of swirl chamber 260 in order to establish a fluid tight seal at the rear of the swirl chamber. One or more shallow slot means 266 extend the length of swirl stem 264 on the surface thereof and open into swirl chamber 260 in a forward and tangential direction with respect to the swirl chamber wall surface. Slots 266 open into swirl chamber 260 only at a position relatively close to the wall surface thereof at a position which is laterally remote from axial duct 270 and to the rear of the open terminus of axial duct 270. Slot means 266 extend through not more than a minor proportion of the rear wall surface of the swirl chamber. In operation, pressurized air from chamber 268 passes through slot 266 and enters swirl chamber 260 in a forward and tangential direction with respect to the swirl chamber wall surface. The air swirls within swirl chamber 260 and travels axially therethrough moving past the open terminus of axial duct 270 in a direction which is substantially entirely parallel with respect to the duct opening whereby fluid, such as fuel oil, is freely aspirated through the open terminus of axial duct 270. A mixture of air and oil is sprayed through nozzle discharge opening 262.

FIGURE 12 shows the nozzle of FIGURE 11 modified by the addition of a second swirl chamber. In FIGURE 12, the mixture of fuel and air from the first swirl chamber is passed through a second cylindrical duct 272 into a second swirl chamber 274. Second swirl chamber 274 is defined by a uniform axial cylindrical bore in threaded cap 276. The diameter of swirl chamber 274 is greater than the diameter of second axial duct 272. Secondary pressurized air enters the second swirl chamber through conduit 278, passageway 280, and clearance 282, and flows into one or more slot means 284 on cylindrical swirl stem 286. Slot means 284 do not extend through more than a minor proportion of the rear wall surface of second swirl chamber 274. Secondary air is directed into second swirl chamber 274 by slot means 284 in both a forward and tangential direction with respect to the swirl chamber wall surface. The secondary air swirls within swirl chamber 274 and travels axially therethrough moving past the open terminus of duct 272 in a direction which is substantially entirely parallel with respect to the nozzle axis creating an aspirational effect upon the mixture of air and oil leaving first swirl chamber 260 and enriching the air content of said mixture.

FIGURE 13 shows the modification of the single conically shaped swirl chamber of FIGURE 7 by the addition of a second swirl chamber similar to the second swirl chamber shown in FIGURE 12. Referring to FIGURE 13, the mixture of air and a fluid, such as fuel oil, from the first swirl chamber travels through cylindrical duct 288 into a secondary cylindrical swirl chamber 290. Secondary air is admitted to swirl chamber 290 in a forwardly and tangential direction with respect to the wall surface thereof through tangential slot 292 on swirl stem 294.

Figures 14, 15:
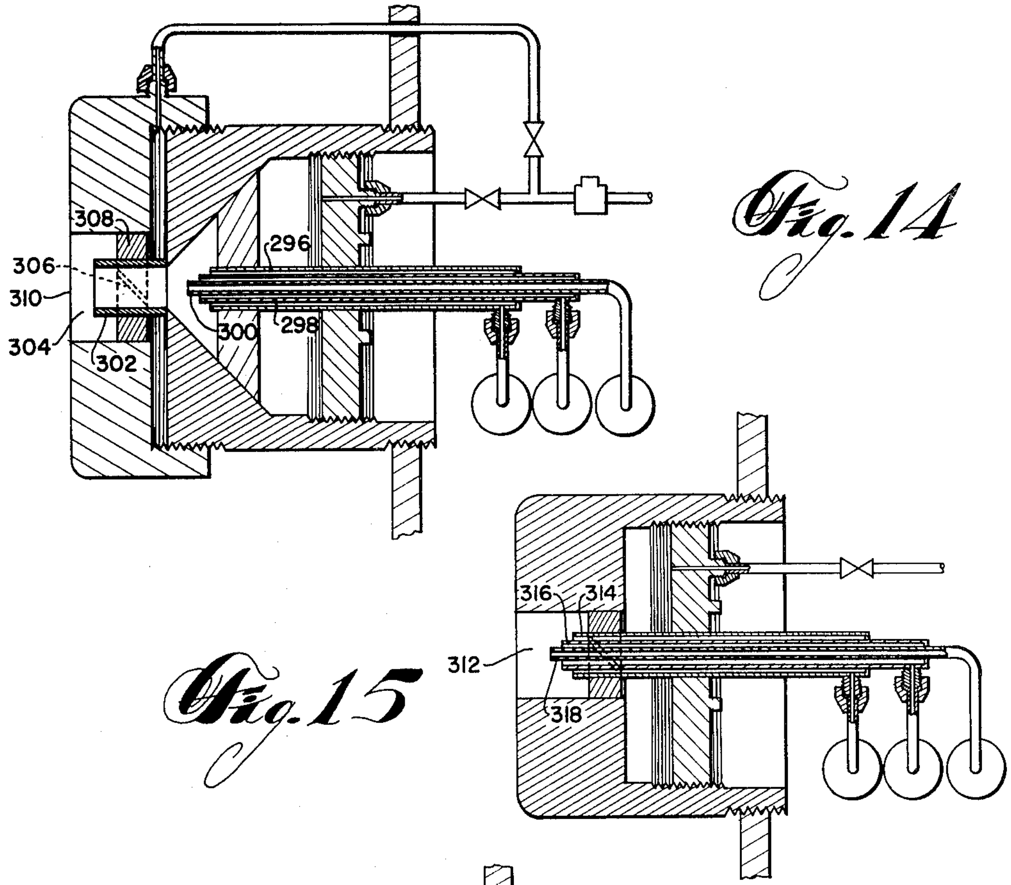

FIGURE 14 is a modification of the conically shaped single swirl chamber of FIGURE 9 which is adapted to aspirate a plurality of fluids through a plurality of staggered cylindrical ducts, designated as ducts 296, 298 and 300. The nozzle of FIGURE 14 employs a secondary swirl chamber having a cylindrical configuration. A mixture of air and the fluids drawn through the staggered cylindrical ducts is passed through cylindrical duct 302 into second swirl chamber 304. Secondary air is admitted into second swirl chamber 304 through slot 306 on swirl stem 308 and a swirling mixture enriched with secondary air is discharged through second swirl chamber discharge opening 310.

Figure 16:
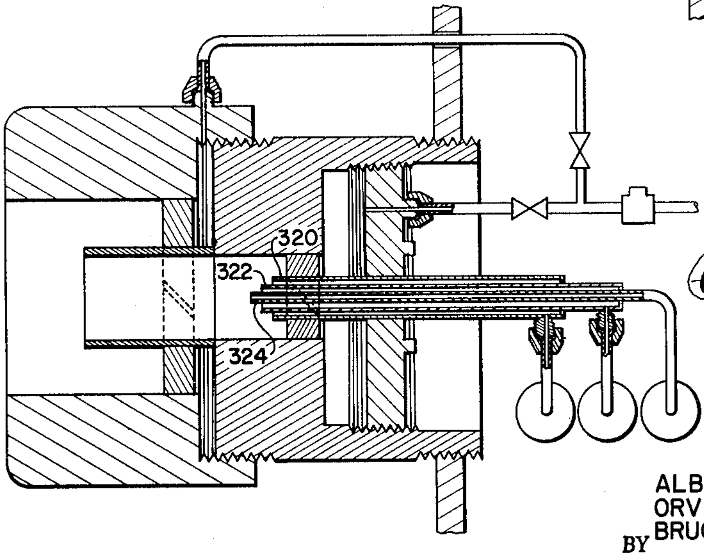

FIGURE 15 shows a nozzle similar to the nozzle shown in FIGURE 11 wherein the swirl chamber is cylindrically shaped, as shown at 312, except that a plurality of staggered axial tubes 314, 316 and 318 is utilized rather than a single axial tube as shown in FIGURE 11. Similarly, FIGURE 16 shows a nozzle which is similar to that shown in FIGURE 12 except that a plurality of staggered cylindrical axial tubes 320, 322 and 324 extend into the first swirl chamber, rather than a single axial tube as shown in FIGURE 12. The discharge orifice is larger than the inside diameter of the largest tubular duct terminating in front thereof.

It is critical that the swirl chamber wall surface of the nozzle of this invention should be either the hollow interior surface of a uniformly converging cone having an open apex which defines a discharge orifice or the hollow interior surface of a uniform cylinder. The conical or cylindrical swirl chamber surface extends from the rear of the open terminus of the axial cylindrical duct to the smallest axial opening in front of the open terminus of the axial cylindrical duct, which is the discharge orifice. A uniform converging conical configuration or a uniform cylindrical configuration permits the axial velocity of the swirling gas stream to remain relatively uniform during transit of the swirling gas stream along the length of the swirl chamber. A swirl chamber wall surface configuration which causes a substantial reduction in axial velocity of the swirling gas stream within the swirl chamber should be avoided. For example, a hemispherical swirl chamber wall surface configuration would cause the axial velocity of the swirling gas stream to diminish during transit of the swirling gas stream along the length of the swirl chamber until the velocity became substantially zero at the discharge orifice. A zero velocity at the discharge orifice requires that the axial acceleration of the swirling air stream precisely at the discharge orifice must be extremely high in order to transform the axial velocity at that point from nearly zero to full burner discharge velocity. Now, the only force tending to axially accelerate the swirling mixture of air and oil in a burner nozzle through the discharge orifice is the pressure of the air charged to the swirl chamber, since this pressure is the only external force applied to the nozzle, the liquid external force applied to the nozzle, the liquid oil being under atmospheric pressure. At a constant pressure of air charged to the nozzle, the axial force tending to axially accelerate the swirling mixture of air and oil in an axial direction through the discharge orifice remains constant. According to the law: Force=Mass×Acceleration, at a constant air pressure the product of mass moving axially through the nozzle times the axial discharge acceleration is also a constant. If the axial velocity at the discharge orifice is almost zero, as would occur with a hemispherically shaped swirl chamber, the axial acceleration to full burner axial discharge velocity which occurs at the discharge orifice is necessarily large, and therefore the amount of mass that can be carried axially through the discharge orifice is relatively small. Since most of the mass in a swirling mixture of air and liquid oil is comprised of the heavier liquid oil, the relatively light air will move forwardly through the discharge orifice leaving the relatively heavy liquid oil within the swirl chamber.

The use of a conical or cylindrical swirl chamber, in contrast to a swirl chamber wall surface configuration which causes a reduction in axial velocity of the swirling gas stream as it travels within the swirl chamber, such as a hemispherical swirl chamber, is critical when a nozzle is utilized for purposes of aspiration. When the swirl chamber wall converges conically from a position to the rear of the axial terminus of the tubular duct to the discharge orifice, which is the narrowest portion of the forward discharge passage, or has the contour of a uniform cylinder over the same region, the forward or axial component of velocity of a swirling gas stream remains uniform from the rear to the front of the swirl chamber, so that at the discharge orifice the swirling stream does not have to accelerate in a forward direction from a substantially zero forward velocity to full axial discharge velocity. With a conical or cylindrical swirl chamber, the forward velocity of the swirling stream is substantially the same at the front and rear of the swirl chamber, but with a hemispherical swirl chamber there occurs a continual decrease of the axial velocity of a swirling gas stream until its forward velocity is nearly zero near the discharge orifice.

Even though the swirl chamber wall surface of this invention converges as a substantially uniform hollow cone or extends as a substantially uniform hollow cylinder from a position to the rear of the axial terminus of the tubular duct to the discharge orifice, it is also critical that this conical or cylindrical configuration extend all the way back to the swirling means and that no portion of the swirl chamber wall surface diverge in front of the swirling means. A diverging swirl chamber wall surface in front of the swirling means causes expansion of the pressurized swirling gas and thereby induces loss of swirling velocity. The only way to increase such lost swirling velocity is to increase the pressure of the aspirating gas. However, an increase in aspirating gas pressure tends to flood the swirl chamber with pressurized air, thereby reducing aspiration therein.

The diameter of a cylindrical swirl chamber of this invention is prefarably about 1.5 to 3 times the internal diameter of its associated axial duct for optimum aspiration through the duct. The length of a cylindrical swirl chamber is preferably no greater than its diameter. However, these dimensions are merely preferable and a wide range of dimensions can be utilized with good results. Whatever dimensions are optimum for a particular nozzle it is highly important that a cylindrical swirl chamber be uniformly cylindrical along its entire length. For example, if a cylindrical swirl chamber tends to diverge conically along its length, with the larger opening of the cone exposed to the atmosphere, the centrifugal effect in the swirling gas stream will cause the stream to diverge in passing the axial duct opening thereby forming a progressively growing central vortex. The diameter of the vortex will be the largest upon exposure to the atmosphere. Such an arrangement would permit easy access of the atmosphere to the vortex, thereby sharply reducing or destroying its vacuum. It is seen that a diverging flow of the aspirating gas in passing the terminal opening of the axial tube exposes a larger vortex diameter to the atmosphere than that exposed to the axial inlet tube, thereby permitting the atmosphere to destroy the vacuum and preventing fluid aspiration through the tube. In such a case, the problem becomes enhanced if the length of the swirl chamber is great, especially if the length of the swirl chamber is greater than the diameter of the swirl chamber.

The adverse effect of a swirling gas stream progressively diverging in its passage by the axial duct opening during its transit to the atmosphere is avoided by employing a swirl chamber which is either a uniform cylinder or is a converging cone. With these swirl chamber configurations, the diameter of the discharge orifice is no longer than the diameter at any intermediate point inside the swirl chamber with which it is associated, and the vortex of the swirling gas in the region of exposure to the atmosphere therefore cannot be larger than the vortex of the swirling gas in the region to which the axial duct opening is exposed. With this construction the difficulty of the atmosphere destroying the vacuum at the swirling gas vortex is substantially avoided and aspiration of fluid through the axial duct is enhanced.

It was found that if the axial inlet port and the tangential aspirating gas openings are both flush with the base of an aspirating swirl chamber, the aspirating gas is unable to effect aspiration of the fluid in the axial port. In a test made with such an apparatus, aspirating air was unable to aspirate sufficient fuel oil to discharge a combustible mixture from the nozzle.

It was further found by tests that the exterior surface of the axial inlet duct must extend longitudinally parallel to the nozzle axis. It was found that if the exterior of the axial inlet duct constituted a cone with its broad base coincident with the rear of the swirl chamber and its smaller base closest to the swirl chamber orifice, it was not possible to aspirate sufficient fuel to discharge a combustible mixture from the nozzle. It was also found that if the exterior of the axial inlet duct is hemispherical in shape with the base of the hemisphere coincident with the rear wall of the swirl chamber it was not possible to aspirate sufficient fuel to discharge a combustible mixture from the nozzle. In contrast, when an axial duct whose exterior surface had a cylindrical shape was employed highly satisfactory combustion was achieved. The reason evidently is that a portion of the pressurized aspirating air expands toward the center of the swirl chamber upon entering the swirl chamber and, when employing a conical or hemispherical axial duct, this air is caused to flow past the port opening in a direction at least partially transverse to the opening, thereby blocking the opening. On the other hand, with a cylindrical axial duct the only axial component of movement of the expanding air traveling in the immediate region of the duct opening is completely parallel to the opening thereby preventing back pressure against the opening and thereby allowing aspiration to proceed.

There is a functional advantage inherent in the use of an axial duct which is cylindrical over substantially its entire length which advantage occurs over and above avoidance of transverse air flow in front of the terminal duct opening. This advantage lies in the fact that when the entire length of axial duct is cylindrical the air adjacent to the duct flows in a direction which is parallel to the axis of the duct and thereby exerts a positive aspirational effect at the duct opening in its own right, aside from avoidance of the negative effect of transverse obstruction of the duct opening. Therefore, when parallel flow past the duct opening occurs two benefits are obtained: first, obstruction of the duct opening is avoided and, secondly, an additional aspirational effect is exerted at the duct opening.

The axial duct through which a fluid is being aspirated should not terminate at the beginning of the discharge orifice of a conical swirl chamber. The reason is that air traveling along the wall of a conical swirl chamber will be directed transversely across the opening of the axial duct at that position and thereby inhibit or prevent aspiration through the duct.

In order to insure that the fluids being aspirated enter the nozzle solely through the effect of aspiration it is advantageous that no level of these fluids exist above the nozzle and that these fluids be drawn from supply reservoirs which are exposed to the atmosphere and located below the nozzle. In this manner, when the aspirating gas supply to the nozzle is interrupted and the suction effect disappears no dripping of fluids such as oil from the nozzle occurs as often does occur in a system wherein the oil is supplied to the nozzle under pressure rather than by aspiration.

In order to prevent interference with the aspirating gas, the nozzle of this inventiton is free of means tending to impart swirling to the liquid flowing within and emerging from the axial duct. Thereby, the liquid emerging from the axial duct enters the swirl chamber in a purely axial direction and does not interfere with the motion of the swirling gas within the swirl chamber. In contrast, if the liquid were to exit from axial duct with a swirling motion, upon entering the swirl chamber it would tend to be flung radially under centrifugal force, thereby directly intruding upon the swirling gas stream and tending to interfere with the motion of the swirling gas stream within the swirl chamber. Since it is the swirling motion of the gas stream which provides the means for aspiration, any interference with this stream is an interference with the heart of nozzle operation.

In the nozzle of this invention, it is important that the diameter of the discharge orifice is larger than the internal diameter of the axial tubular duct. The reason is that the discharge orifice must be sufficiently large to discharge the liquid being aspirated through the tubular duct plus a relatively large volume of aspirating gas. If the diameter of the discharge orifice is the same size as the internal diameter of the tubular duct it will only be large enough to freely discharge the aspirated liquid. Unless the diameter of the discharge orifice is larger than the internal diameter of the tubular duct, it will not be sufficiently large to freely discharge both the aspirated liquid and the relatively large volume of swirling gas, and will therefore obstruct discharge from the nozzle and thereby prevent aspiration.

The swirl chamber of the nozzle of this invention is provided with rear enclosure means extending from the exterior of the axial tubular duct so that the swirl chamber is substantially completely enclosed at the rear thereof and the openings of the swirling means extend through not more than a minor proportion of the surface of the rear wall of the swirl chamber. The openings of the swirling means are thereby restricted by the swirl chamber wall rear enclosure. These openings are directed into the swirl chamber in not only a tangential direction but also in a forwardly direction with respect to the conical or cylindrical swirl chamber wall surface which surrounds the open terminus of the axial tubular duct. This structure is extremely critical to the function of an aspirating nozzle, especially if the aspirating nozzle is utilized as an oil burner. A swirling air aspirating nozzle performs its aspirating function by establishing a highly evacuated central vortex at the center of a swirling gas stream which induces aspiration of liquid oil. To establish a highly evacuated central vortex, it is necessary that only a limited quantity of pressurized swirling air be charged to the swirl chamber and that this air be discharged from the swirl chamber as rapidly as possible because if an excessive quantity of air is charged to the swirl chamber or is permitted to accumulate within the swirl chamber it will fill the entire chamber, thereby flooding the chamber and filling the axial region thereof with air, preventing the formation of an evacuated axial vortex. Excessive inflow of pressurized air is prevented by utilizing rear enclosure means in the swirl chamber surrounding the exterior of the tubular duct so that the major proportion of the rear wall surface of the swirl chamber is enclosed, with the swirling opening means extending through not more than a minor proportion of the rear wall of the swirl chamber. In the absence of a rear enclosure means, air could swirl within the swirl chamber but the amount of air admitted would be so excessive that the chamber would become flooded with pressurized air and an evacuated vortex adequate to accomplish aspiration could not possibly form. Also, excessive accumulation of pressurized air within the swirl chamber is prevented by directing the aspirating air into the swirl chamber in a forward as well as a tangential direction so that the swirling air rapidly travels to the discharge orifice of the swirl chamber. Tangential but non-forward admission of pressurized air would tend to cause the air to swirl in situ at the rear of the swirl chamber, and thereby accumulate within the swirl chamber, flooding the swirl chamber with air.

Not only is the rear of the swirl chamber enclosed but also the swirling means opens into the swirl chamber only at the converging conical swirl chamber wall surface or the cylindrical swirl chamber wall surface extending past the terminus of the tubular duct. It is critical that the swirling means open into the swirl chamber only at a position laterally remote from the tubular duct in order to supply a jet of pressurized air directly at the curved swirl chamber wall surface entirely remote from the tubular duct. In this manner, the air swirls as a thin film in close proximity to the swirl chamber wall surface permitting the axial portion of the swirl chamber to remain relatively free of pressurized gas.

If a nozzle does not possess enclosure means at the rear of the swirl chamber to restrict the volume of pressurized air flow, even if it succeeds in aspirating a small quantity of fuel it could not function as a burner nozzle. The reason is that if too much pressurized air is admitted to a burner nozzle swirl chamber, the air exit velocity at the nozzle discharge orifice will become greater than the velocity of flame propagation, and the nozzle will not be able to maintain a flame. This is a common phenomenon and is often observed in a blow torch. As the velocity of the combustion mixture being discharged from a blow torch increases the flame can be observed to move progressively further away from the torch until it finally disappears. The flame disappears completely when the exit velocity of the combustion gas mixture becomes appreciably greater than the velocity of flame propagation. This phenomenon is commonly observed in aspirating burner nozzles wherein a stream of swirling air aspirates fuel oil. When an aspirating nozzle is employed as an oil burner, provision of enclosure means at the rear of the swirl chamber to restrict the volume of pressurized air flow is therefore highly critical in order to prevent aspirating air discharge velocity from becoming greater than the velocity of flame propagation.

It is seen that there is a critical upper limit for the discharge velocity from a burner nozzle. Therefore, there is a critical upper limit to air flow rate through an aspirating nozzle swirl chamber because at any given air flow rate, nozzle discharge velocity cannot be diminished by arbitrarily increasing the size of the discharge orifice since an increase in discharge orifice size tends to destroy the vacuum within the nozzle by permitting access of the atmosphere thereto. However, it has been found to be highly advantageous in a burner nozzle to admix with the aspirated oil an amount of pressurized air in excess of the critical upper limit that can be passed through an aspirating nozzle swirl chamber. In accordance with the present invention, the additional pressurized air is advantageously supplied by employing a second swirl chamber in the nozzle in series with the aspirating swirl chamber with the second swirl chamber having a discharge orifice larger than that of the aspirating chamber. Secondary pressurized air is admitted to the second swirl chamber in a forward and tangential direction with respect to the second swirl chamber wall surface and the second swirl chamber is otherwise constructed in the manner of an aspirating swirl chamber of the present invention so that the mixture of swirling air and oil from the aspirating swirl chamber is admitted to the second swirl chamber through a cylindrical axial duct extending from the aspirating swirl chamber discharge orifice to an intermediate axial position in the second swirl chamber. The discharge orifice of the second swirl chamber is larger than the discharge orifice of the first chamber by an amount adequate to accommodate the discharge of the secondary air in addition to the air-oil mixture from the aspirating swirl chamber. In this manner, the secondary air does not inhibit aspiration by flooding the aspirating chamber, because it is not admitted to the aspirating chamber, nor does it increase nozzle discharge velocity beyond its critical upper limit, because of the use of the larger discharge orifice. If desired, more than one additional swirl chamber can be provided in series with an aspirating swirl chamber, with swirling pressurized air admitted to each additional swirl chamber and with each succeeding discharge orifice being larger in size than its predecessor discharge orifice.

In all aspirating nozzles of this invention, it has been found advantageous to employ a forward chamber which does not have aspiration as its primary function but which functions to enrich the mixture from the aspirating swirl chamber with a swirling stream of secondary air. The employment of a forward pressurized air swirl chamber in an aspirating burner nozzle of this invention was found to greatly improve the flame produced upon combustion of an air-oil spray therefrom, as compared to the flame produced in its absence, in respect to both flame compactness and smoke reduction.

In a multiple swirl chamber nozzle of this invention, it is critical that each swirl chamber to which a pressurized fluid is charged possess all the essential structure of a single swirl chamber nozzle of this invention, except that each swirl chamber which is forward with respect to the first swirl chamber will receive a swirling mixture through the axial duct extending thereinto. The wall surface of the first and forward swirl chambers in a multiple swirl chamber nozzle can both have a conical configuration or they both can have a cylindrical configuration. If desired, the first swirl chamber can have a conical wall surface with the forward swirl chamber having a cylindrical wall surface, or vice versa. In a series of swirl chambers in a single nozzle, conical or cylindrical wall surface configurations can be utilized in any combination as long as each swirl chamber to which a pressurized fluid is charged possesses all the essential structure of a single swirl chamber nozzle.

In accordance with this invention, a spray comprising a mixture of pressurized air and aspirated oil suitable for combustion is prepared by charging a stream or jet of pressurized air in a forward and substantially tangential direction along a swirl chamber surface at the rear thereof. The jet impinges upon the swirl chamber surface along only a minor proportion of the circumference thereof and spreads sideways along said surface so that the major proportion of the pressurized air swirls along the swirl chamber surface as a film which is thin relative to the swirl chamber cross section allowing an axial evacuated vortex to form within said swirl chamber. The open end of a duct containing fuel oil under a pressure lower than that of the pressurized air and preferably under substantially atmospheric pressure is axially exposed to the vortex. The only axial component of movement of the pressurized air which expands into the region surrounding said fuel oil duct opening is parallel to the axis of the swirl chamber. The swirling air stream travels the length of said swirl chamber at a substantially uniform axial velocity. The fuel oil is aspirated into the vortex of the swirling gas stream. The amount or pressure of the air admitted to the swirl chamber is adjusted so as to be sufficiently high to produce a combustible spray mixture but sufficiently small so that the spray mixture of swirling air and aspirated oil is discharged from the nozzle at a velocity which is not appreciably greater than the velocity of flame propogation.

In nozzles wherein more than one fluid is aspirated inwardly by means of the suction exerted at the vortex of a swirling gas stream, a variety of structures can be employed. In one embodiment, a plurality of coaxial, concentric cylindrical ducts extend into the rear of a swirl chamber to various intermediate points along the axis thereof, the innermost concentric duct extending furthest into the swirl chamber, the duct next surrounding the innermost duct extending a smaller distance into the swirl chamber, etc. The outermost duct extends the smallest distance into the swirl chamber but even this outermost duct extends a greater distance from the rear of the swirl chamber than does the tangential opening for the admittance of aspirating gas. In this arrangement of coaxial, concentric cylindrical ducts, with each inner concentric duct extending a greater axial distance into the swirl chamber than its next adjacent outer duct and with even the outermost concentric duct extending a greater distance from the rear of the swirl chamber than the distance of the aspirating gas inlet port from the rear of the swirl chamber, each concentric duct connects the swirl chamber and its respective reservoir of fluid, which reservoir is disposed below the nozzle, and each duct preferably extends into its respective reservoir downwardly through the level of fluid contained therein.

In nozzles wherein more than one fluid is aspirated inwardly by means of the suction exerted at the vortex of a swirling gas, concentric arrangement of the axial ducts permits maximum proximity of the fluids under aspiration to the axis of the swirl chamber, which is the zone of greatest vacuum. In this arrangement, the staggering of duct lengths, as described, permits a high degree of uniformity of exposure of the plurality of fluids under aspiration to the vortex of surrounding swirling fluid. In operation, the vortex of the aspirating gas draws into the swirling stream of aspirating gas a first fluid entering through the outermost annular space formed by the concentric ducts to produce a first mixture comprising aspirating gas and said first fluid. The greatest length of the next adjacent annular space allows this first mixture to form an adequate swirl pattern and vortex prior to drawing into itself a second fluid through the next adjacent annular space to form a second mixture comprising aspirating gas, first fluid and second fluid. Again, the increasing length of each adjacent annular space allows this second mixture to form an adequate swirl pattern and vortex prior to aspirating a third fluid to form a third mixture comprising aspirating gas and said first, second and third fluids. In a like manner, the fluid in each subsequent duct is aspirated into the nozzle. The preferred number of concentric tubes is two: a first fluid in the inner tube being exposed to the axis of the swirl chamber, which is the zone of greatest vacuum, and the inner tube extending a greater distance into the swirl chamber than the outer tube. In this arrangement, a second fluid enters the swirl chamber through the annular space between the two tubes.

Because of size limitation in burner nozzles it is often essential that multiple fluid aspirating nozzles which are to be employed as burners have multiple, coaxial chambers. When employing a nozzle having only one chamber it is necessary to aspirate all the fluids into a single chamber which necessitates severe restriction of duct passages. As already noted, when fuel oil is the fluid being passed through a nozzle, restriction of duct passages is conducive to plugging. However, with a multiplicity of chambers an apportioning of the fluids under aspiration between the available chambers is possible, thereby avoiding restriction of duct passages in any single chamber. In a multiple chamber nozzle it is preferable to aspirate only a single fluid into the first chamber through a cylindrical axial duct extending to an intermediate point along the length of said chamber. The mixture emitted from this first chamber is then discharged through an axial orifice at the forward end of the first chamber which leads to a second chamber coaxial with the first, also having an axial orifice at its forward end and having at least one side port, preferably tangential, for the admission of a second fluid by means of aspiration. Subsequent chambers substantially similar to the second chamber can be employed.

The mixture emitted from the first chamber can enter the second chamber at an intermediate position along the length of the second chamber by means of a duct extending thereto from the first orifice. Such a duct is preferably generally cylindrical and has approximately the diameter of the orifice from which it protrudes. The diameter of the second chamber is larger than the diameter of this duct thus providing an annulus through which the first mixture exerts an aspirational effect. The aspirational effect draws the second fluid through the annulus into the first mixture. The quantity of second fluid aspirated is dependent upon the diameter differential between the second chamber and the duct. Of course, at a zero diameter differential no opening exists and therefore no aspirational flow occurs. As the diameter differential increases the rate of fluid aspiration correspondingly increases until a maximum rate occurs following which a further slight diameter differential increase causes a sharp reduction in the rate of aspiration of the second fluid.

The use of a duct extending from the first orifice to an intermediate axial position along the length of the second chamber provides the advantage of accurate delineation of the smaller diameter of the optimum diameter differential. However, we have found that it is possible to aspirate the second fluid at a greater rate in the absence of such a duct. In the absence of the duct, the mixture is projected forwardly and radially from the first orifice as a conical spray. The divergence of the spray requires the diameter of the second chamber to be somewhat larger, for maximum aspirational rates, than the diameter required when the aforementioned duct is utilized. In the absence of a duct, as is the case when a duct is employed, increasing the diameter of the second chamber from the size corresponding to a minimum aspirational rate induces a corresponding increase in rate of aspiration of the second fluid. This increase continues until a maximum aspiration rate occurs whereupon a further slight increase in the diameter of the second chamber results in a sharp reduction of rate of aspiration of the second fluid.

We claim:

1. An aspirating process comprising directing at least one jet of pressurized gas along the interior surface of a uniform hollow cone which is enclosed at the base and open at the apex, said pressurized gas jet being charged directly at the surface of said cone and relatively close to the base of said cone, said pressurized gas jet directed forwardly toward said open apex along a path which is tangential with respect to the conical surface so that said jet is both swirled and rapidly discharged through the apex of said cone without substantial accumulation therein, the opening through which said jet enters said cone being restricted so that the quantity of air in said jet is limited and said jet only being charged directly at the surface of said cone and relatively remote from the longitudinal axis of said cone so that said pressurized gas jet swirls along said conical surface as a relatively thin film in close proximity to the conical wall surface permitting the axial portion of said cone to remain relatively free of pressurized gas and thereby forming an evacuated vortex along the axis of said cone, exposing a fluid under substantially atmospheric pressure to said vortex through the terminal opening of an axial duct extending from the base of said cone to an intermediate axial position within said cone, the outer surface of said axial duct having a substantially cylindrical configuration so that the only axial component of movement of said pressurized gas in the vicinity of said axial duct terminal opening is parallel to the axis of the cone, said swirling pressurized gas jet aspirating fluid through said axial duct terminal opening, and discharging a swirling spray comprising a mixture of said pressurized gas and said fluid through the opening at the apex of said cone.

2. The process of claim 1 wherein said fluid flows from said axial duct in the absence of swirling.

3. The process of claim 1 wherein said gas is air and said fluid is oil.

4. The process of claim 1 wherein said gas is air and said fluid is oil, including the step of adjusting the pressure of the air supplied to said process whereby said pressure is sufficiently high that the quantity of oil aspirated produces a combustible spray but sufficiently low so that the velocity of discharge of said spray is not substantially greater than the velocity of flame propagation.

5. The process of claim 1 including the step of passing said mixture comprising said pressurized gas and said fluid through the opening at the apex of said cone, exposing said mixture to the vortex of a second stream of swirling pressurized gas through the terminal opening of a second duct extending axially forward from said apex opening, the only axial component of movement of said second stream of pressurized gas in the vicinity of said second duct terminal opening being parallel to the axis of said cone, and discharging a swirling spray.

6. A process comprising directing at least one jet of pressurized gas along the interior surface of a hollow cone which is enclosed at the base and open at the apex, said pressurized gas jet being charged directly at the surface of said cone and relatively close to the base of said cone, said pressurized gas jet directed forwardly toward said open apex along a path which is tangential with respect to the conical surface so that said jet is both swirled and rapidly discharged through the apex of said cone without substantial accumulation therein, the opening through which said jet enters said cone being restricted so that the quantity of air in said jet is limited and said jet only being charged directly at the surface of said cone and relatively remote from the longitudinal axis of said cone so that said pressurized gas jet swirls along said conical surface as a relatively thin film in close proximity to the conical wall surface permitting the axial portion of said cone to remain relatively free of pressurized gas and thereby forming an evacuated vortex along the axis of said cone, exposing a plurality of separate fluids each under substantially atmospheric pressure to said vortex through the terminal openings of a plurality of axial ducts extending forwardly from the base of said core, the only axial component of movement of said pressurized gas in the vicinity of said axial duct terminal openings being parallel to the axis of the cone, said swirling pressurized gas jet aspirating a stream of fluid through each of said axial duct terminal openings, and discharging a swirling spray comprising a mixture of said pressurized gas and said fluids through the opening at the apex of said cone.

7. The process of claim 6 wherein said plurality of axial ducts extend concentrically to a plurality of axial positions along the length of said cone, with each inner axial duct extending further toward the apex of said cone than its next adjacent outer duct.

(References on following page)

References Cited by the Examiner

UNITED STATES PATENTS

| | | | |
|---|---|---|---|
| 1,239,168 | 9/1917 | Eneas | 239—8 |
| 1,346,750 | 7/1920 | Herman | 239—405 |
| 2,984,421 | 5/1961 | Hession | 239—406 |

FOREIGN PATENTS

| | | |
|---|---|---|
| 392,030 | 5/1933 | Great Britain. |
| 566,133 | 12/1944 | Great Britain. |
| 131,979 | 6/1929 | Switzerland. |

EVERETT W. KIRBY, *Primary Examiner.*